(12) United States Patent
Yamaguchi et al.

(10) Patent No.: US 8,627,798 B2
(45) Date of Patent: Jan. 14, 2014

(54) DIRECT FUEL-INJECTION ENGINE

(75) Inventors: Akihiro Yamaguchi, Wako (JP); Yoshimasa Kaneko, Wako (JP); Yukihisa Yamaya, Wako (JP); Yutaka Tajima, Wako (JP); Kenichiro Ikeya, Wako (JP); Goichi Katayama, Wako (JP); Nobuhiko Sasaki, Wako (JP); Hiroshi Sono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1093 days.

(21) Appl. No.: 12/620,407

(22) Filed: Nov. 17, 2009

(65) Prior Publication Data
US 2010/0147260 A1   Jun. 17, 2010

(30) Foreign Application Priority Data

Dec. 17, 2008   (JP) ................. 2008-320910

(51) Int. Cl.
*F02F 3/26* (2006.01)
(52) U.S. Cl.
USPC ............ 123/276; 123/295; 123/299; 123/307
(58) Field of Classification Search
USPC ......... 123/261, 276, 279, 280, 295, 298, 299, 123/300, 307, 661, 664, 665
See application file for complete search history.

(56) References Cited

U.S. PATENT DOCUMENTS

| | | | | |
|---|---|---|---|---|
| 2,682,862 A | * | 7/1954 | Camner ..................... | 123/276 |
| 4,207,843 A | * | 6/1980 | List et al. .................... | 123/261 |
| 7,013,861 B1 | * | 3/2006 | Hutmacher et al. ......... | 123/276 |
| 7,861,685 B2 | * | 1/2011 | Sono et al. .................. | 123/298 |
| 7,992,536 B2 | * | 8/2011 | Ikeya et al. ................. | 123/276 |
| 2005/0045145 A1 | * | 3/2005 | Hiraya et al. ............... | 123/276 |
| 2005/0115538 A1 | * | 6/2005 | Ono et al. ................... | 123/276 |
| 2009/0314253 A1 | * | 12/2009 | Sono et al. .................. | 123/298 |
| 2010/0006061 A1 | * | 1/2010 | Shibata et al. .............. | 123/307 |

FOREIGN PATENT DOCUMENTS

| | | |
|---|---|---|
| DE | 500 123 C | 6/1930 |
| EP | 1 357 274 A1 | 10/2003 |
| FR | 2 818 325 A1 | 6/2002 |
| JP | 04-031651 A | 2/1992 |
| JP | 7-324661 A | 12/1995 |
| JP | 2000-145461 A | 5/2000 |
| JP | 2000-352326 A | 12/2000 |
| JP | 2001-227345 A | 8/2001 |
| JP | 2001-227346 A | 8/2001 |
| JP | 2002-122024 A | 4/2002 |

(Continued)

*Primary Examiner* — Willis R Wolfe, Jr.
*Assistant Examiner* — Anthony L Bacon
(74) *Attorney, Agent, or Firm* — Arent Fox LLP

(57) ABSTRACT

A direct fuel-injection engine includes a piston, a cavity recessed in a central part of a top face of the piston, and a fuel injector. At a main injection collision point of a fuel-injection axis when main injection is performed while the piston is near top dead center, a main injection collision angle formed between its tangent and the fuel-injection axis is set at an obtuse angle. Fuel colliding with the main injection collision point is deflected towards a cavity open end side. At a secondary injection collision point of the fuel-injection axis when performing secondary injection with the piston is further from top dead center, a secondary injection collision angle formed between its tangent and the fuel-injection axis is set at one of a right angle and an acute angle. Fuel colliding with the secondary injection collision point is deflected primarily in the circumferential direction of the cavity.

2 Claims, 14 Drawing Sheets

(56) References Cited

FOREIGN PATENT DOCUMENTS

| JP | 2002-276373 A | 9/2002 |
| JP | 2002-276374 A | 9/2002 |
| JP | 2002-349267 A | 12/2002 |
| JP | 2008-002443 A | 1/2008 |
| JP | 2008-014177 A | 1/2008 |
| JP | 2008-038650 A | 2/2008 |
| WO | WO2008004398 | * 1/2008 |

* cited by examiner

CROSS-SECTION IN DIRECTION INTERSECTING PISTON PIN AT 60°

CROSS-SECTION IN DIRECTION ALONG PISTON PIN

CROSS-SECTION IN DIRECTION ALONG PISTON PIN

CASE IN WHICH PISTON IS IN VICINITY OF TOP DEAD CENTER

CASE IN WHICH PISTON IS AT POSITION AWAY FROM TOP DEAD CENTER

CROSS-SECTION IN DIRECTION
INTERSECTING PISTON PIN AT 60°

CASE IN WHICH PISTON IS IN
VICINITY OF TOP DEAD CENTER

CASE IN WHICH PISTON IS AT POSITION
AWAY FROM TOP DEAD CENTER

DIRECT FUEL-INJECTION ENGINE

BACKGROUND OF THE INVENTION

1. Field of the Invention

The present invention relates to a direct fuel-injection engine having a cavity recessed in a central part of the top face of a piston, and a fuel injector for injecting fuel into the cavity. The fuel injector carries out main injection along a fuel-injection axis oriented toward an inner wall face of the cavity when the piston is in the vicinity of top dead center, and carries out secondary injection along the same fuel-injection axis when the piston is positioned further from top dead center than during main injection.

2. Description of the Related Art

Japanese Patent Application Laid-open No. 7-324661 (JP '661) discloses a direct fuel-injection diesel engine in which a fuel injector is provided with a first injection hole for pilot injection and a second injection hole for main injection. JP '661 teaches that when fuel is subjected to pilot injection (secondary injection) from the fuel injector before a piston reaches top dead center, and fuel is subjected to main injection from the fuel injector when the piston has reached top dead center, fuel is made to collide at an appropriate position within a cavity by setting a small cone angle for fuel that is subjected to pilot injection and a large cone angle for fuel that is subjected to main injection.

Furthermore, Japanese Patent Application Laid-open No. 2001-227345 (JP '345) discloses a direct fuel-injection diesel engine that carries out main and secondary injections along the same fuel-injection axis, wherein the direction of the fuel-injection axis when carrying out secondary injection is oriented toward the open end of a cavity of a piston.

Incidentally, the arrangement disclosed by JP '661 requires the structural arrangement of the fuel injector to be rather complex since it is necessary to provide the fuel injector with the first injection hole for pilot injection and the second injection hole for main injection, thus causing an increase in manufacturing cost.

Furthermore, the arrangement disclosed by JP '345 poses a problem wherein unused air could possibly remain in an upper part of the cavity since the direction of the fuel-injection axis when carrying out secondary injection is oriented toward a high position (open end) of the cavity, the direction of the fuel-injection axis when carrying out main injection is also oriented toward a relatively high position of the cavity, and fuel that has collided with an inner wall face of the cavity, which enlarges in a downward facing direction, is not directed to the open end side of the cavity but is directed to a bottom wall side.

SUMMARY OF THE INVENTION

The present invention has been accomplished in light of the above-mentioned circumstances, and it is an aspect thereof to have a direct fuel-injection engine in which a fuel injector is provided wherein fuel by main and secondary injections is appropriately mixed with air in a cavity, thus minimizing the amount of unused air that is remaining.

According to a first feature of the present invention, a direct fuel-injection engine includes a cavity recessed in a central part of a top face of a piston, and a fuel injector which injects fuel into the cavity. The fuel injector carries out main injection along a fuel-injection axis oriented toward an inner wall face of the cavity when the piston is near top dead center. The fuel injector carries out secondary injection along the same fuel-injection axis when the piston is positioned further from top dead center than during main injection. When an intersection point of the fuel-injection axis with the inner wall face of the cavity during main injection is defined as a main injection collision point, and an intersection point of the fuel-injection axis with the inner wall face of the cavity during secondary injection is defined as a secondary injection collision point, a main injection collision angle formed between the fuel-injection axis and the inner wall face on the open end side of the cavity relative to the main injection collision point is set at an obtuse angle, and a secondary injection collision angle formed between the fuel-injection axis and the inner wall face on the open end side of the cavity relative to the secondary injection collision point is set at a right angle or an acute angle.

In accordance with the first feature, the intersection point of the fuel-injection axis with the inner wall face of the cavity when carrying out main injection with the fuel injector when the piston is near top dead center is defined as the main injection collision point, and the intersection point of the fuel-injection axis with the inner wall face of the cavity when carrying out secondary injection along the same fuel-injection axis with the piston positioned further from top dead center is defined as the secondary injection collision point. Since the main injection collision angle formed between the fuel-injection axis and the inner wall face on the open end side of the cavity relative to the main injection collision point is set at an obtuse angle, it is possible to deflect fuel that has collided with the main injection collision point mainly to the open end side of the cavity to minimize the amount of unused air remaining in an upper part of the cavity. Moreover, since the secondary injection collision angle formed between the fuel-injection axis and the inner wall face on the open end side of the cavity relative to the secondary injection collision point is set at a right angle or an acute angle, it is possible to deflect fuel that has collided with the secondary injection collision point mainly in the circumferential direction of the cavity to minimize the amount of unused air remaining between adjacent fuel-injection axes. Furthermore, since the main and secondary injections are carried out along the same fuel-injection axis, the structure of the fuel injector is simplified.

According to a second feature of the present invention, the shape of the inner wall face of the cavity is configured so that, with N as a whole number of 2 or more, when the cavity is divided into N virtual cavity sections by the inner wall face of the cavity, and N half planes extending radially from the piston central axis and having equal included angles, the volumes of the virtual cavity sections are substantially equal.

Due to the above-described second feature of the present invention, it is possible to provide conditions in which air and fuel are uniformly mixed in the cavity, thereby improving the engine output and reducing harmful exhaust materials.

According to a third feature of the present invention, the fuel injector includes a plurality of fuel-injection axes spaced in the circumferential direction. A cross-section of a cavity passing through an nth fuel-injection axis is defined as a fuel-injection cross-section $S_n$. An intersection point of the fuel-injection cross-section $S_n$ with an open end of the cavity is defined as a first specific point $A_n$. A second specific point $B_n$ is located on a line that passes through the first specific point $A_n$ and is parallel to a lower face of a cylinder head in the fuel-injection cross-section $S_n$. A third specific point $C_n$ is located on a bottom wall portion of the cavity in the fuel-injection cross-section $S_n$. A distance between the second specific point $B_n$ and the piston central axis is shorter than a distance between the first specific point $A_n$ and the piston central axis. A distance between the third specific point $C_n$ and the piston central axis is shorter than a distance between the piston central axis and a position of a maximum outer diameter of the bottom wall portion of the cavity. A cross-sectional shape is surrounded by a path AnBn connecting the first and second specific points An and Bn by a line along the lower face of the cylinder head in the fuel-injection cross-sectional Sn, a path AnCn connecting the first and third specific points An and Cn along the wall face of the cavity in the fuel-injection cross-section Sn, and a path BnCn connecting the second and third specific points Bn and Cn by the shortest straight line. The cross-sectional shape is substantially equal for each fuel-injection cross-section Sn, and is defined as a reference cross-sectional shape. The volume of each virtual cavity section is substantially equal by changing the shape of the inner wall face of the cavity so that the reference cross-sectional shape enlarges for a fuel-injection cross-section Sn passing through a fuel-injection axis defined in a direction where the height of the top face of the piston in the piston central axis direction is lower.

In accordance with the third feature of the present invention and with the cross-sectional shape of the cavity disclosed in Japanese Patent Application Laid-open No. 2008-2443 (JP'443) as a reference cross-sectional shape, by changing the shape of the inner wall face of the cavity so that the reference cross-sectional shape enlarges for the fuel-injection cross-section Sn passing through the fuel-injection axis that is present in the direction where the height of the piston top face in the piston central axis direction is lower, the virtual cavity sections are made to have substantially equal volumes. As such, compared with JP '443, the conditions in which air and fuel are mixed in the fuel-injection cross-sections Sn can therefore be made more uniform.

According to a fourth feature of the present invention, the piston has a pentroof-shaped top face that includes two faces inclined to sandwich a top portion extending in a direction parallel to the axis of a piston pin.

Furthermore, due to the pentroof shape of the piston top face, the intake/exhaust efficiency is enhanced by enlarging the area of an opening of the valve hole. Since the piston top face is asymmetric relative to the piston central axis, there could be a problem of in-cylinder flow being difficult to occur in the circumferential direction and unused air undesirably remaining between fuel-injection axes. However, by setting the secondary injection collision angle at a right angle or an acute angle to promote diffusion of fuel in the peripheral direction of the cavity, it is possible to reduce the amount of unused air between the fuel-injection axes.

According to a fifth feature of the present invention, a fuel-injection axis bevel half angle formed by the fuel-injection axis relative to the piston central axis is in a range of 55° to 65°.

Moreover, due to the fuel-injection axis bevel half angle being formed in a range of 55° to 65°, when secondary injection is carried out by the fuel injector with the piston at a position away from top dead center, injected fuel is prevented from leaking outside through the open end of the cavity.

According to a sixth feature of the present invention, the secondary injection is carried out at a position where the piston is away from top dead center by a crank angle of 30° to 40°.

As such, fuel from secondary injection is prevented from leaking outside through the open end of the cavity while fuel from main injection is prevented from attaching to the bottom wall portion of the cavity.

In the following description a first fuel-injection axis Li1 and a second fuel-injection axis Li2' correspond to a fuel-injection axis of the present invention.

The above description, other aspects, characteristics and advantages of the present invention will become apparent from the detailed description provided below with reference to the attached drawings.

DETAILED DESCRIPTION OF THE PREFERRED EMBODIMENT

Figure 1:
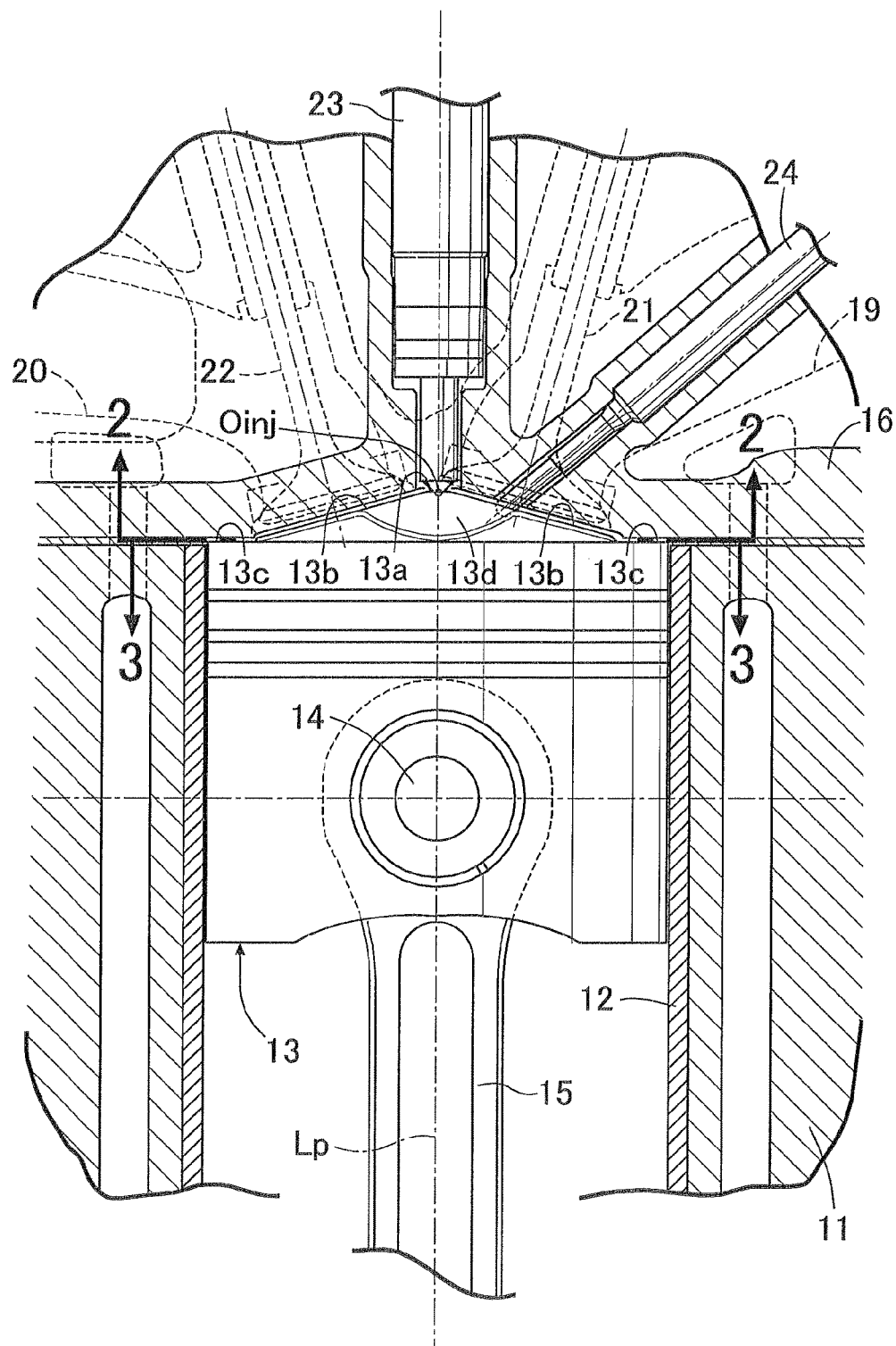
FIG. 1 is a vertical sectional view of a piston slidably fit within a cylinder of a direct fuel-injection type diesel engine according to an embodiment of the present invention.
Figure 2:
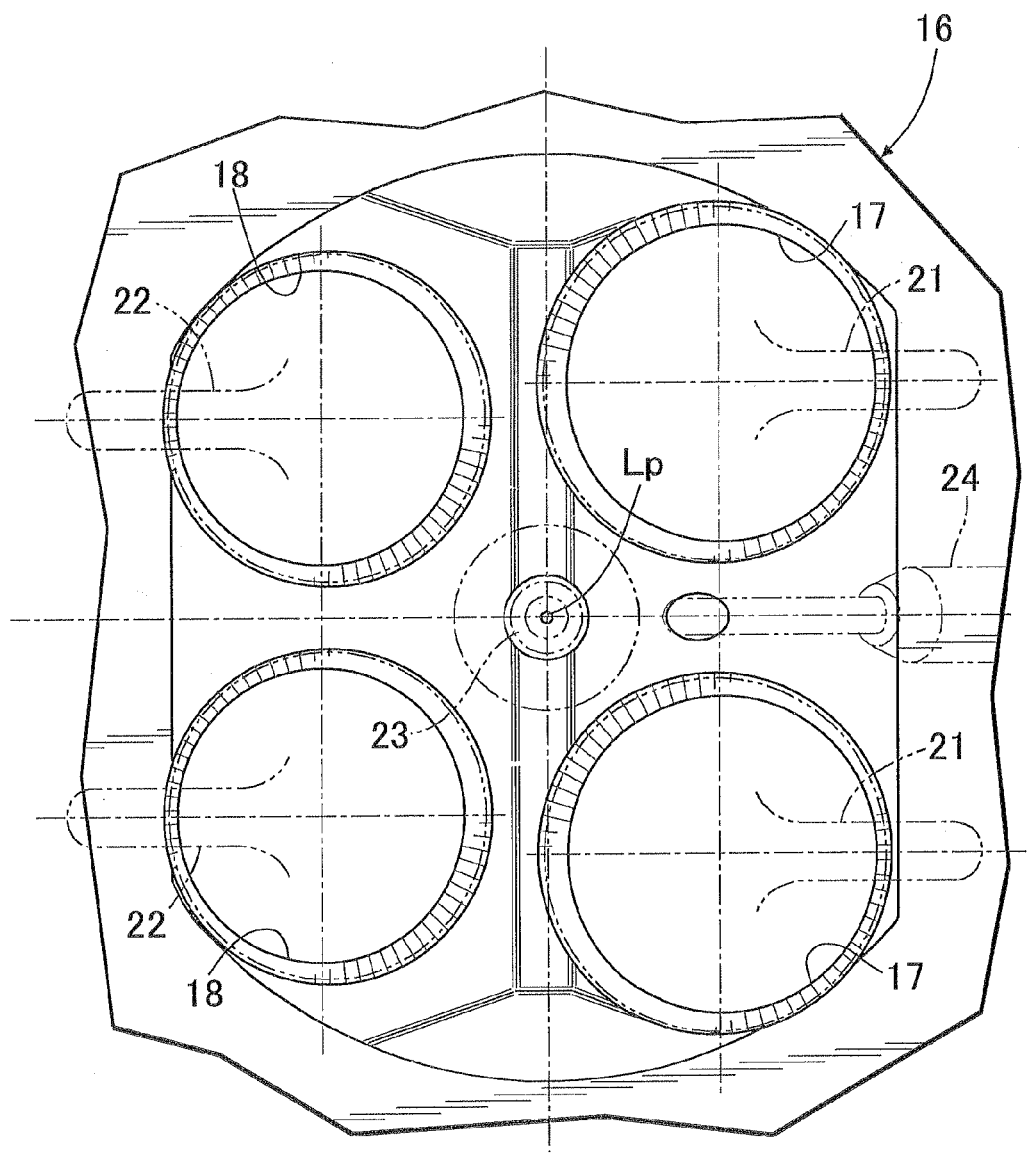
FIG. 2 is a cross-sectional view taken along line 2-2 in FIG. 1.
Figure 3:
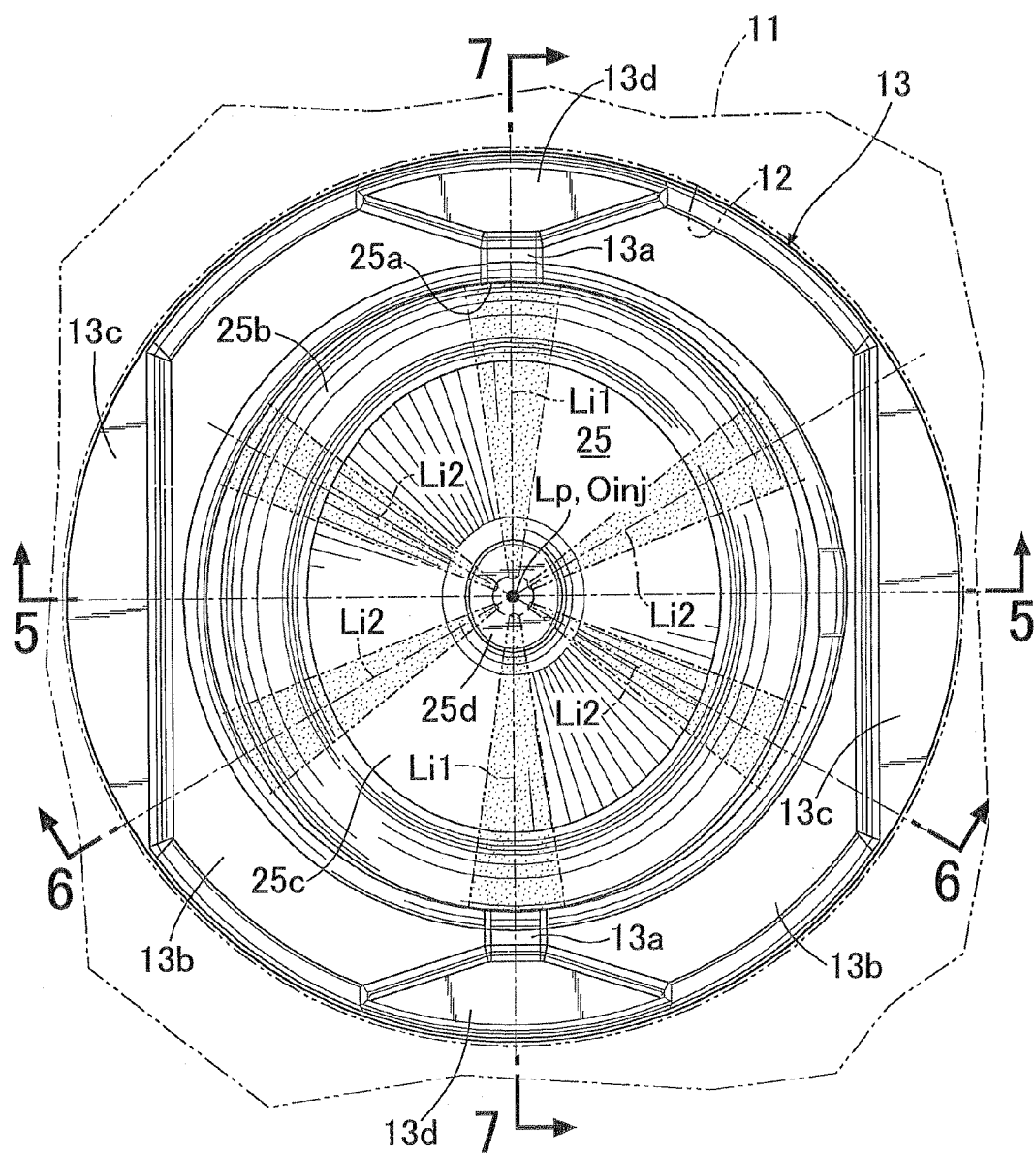
FIG. 3 is a view taken along line 3-3 in FIG. 1.
Figure 4:
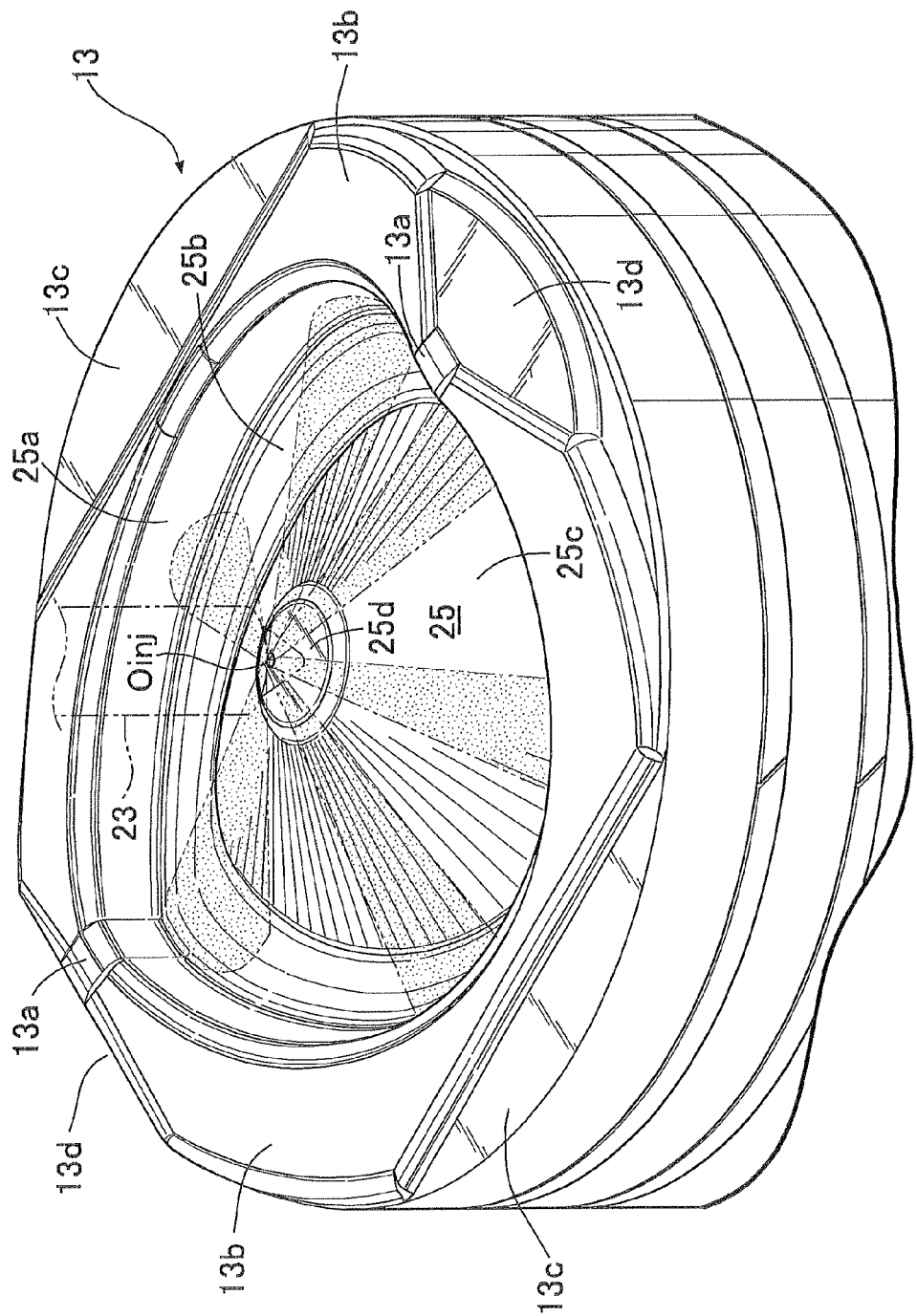
FIG. 4 is a perspective view of an upper part of a piston.

An embodiment of the present invention is explained below with reference to the attached drawings.

As shown in FIGS. 1 to 4, a direct fuel-injection type diesel engine includes a piston 13 slidably fit within a cylinder 12 defined in a cylinder block 11, wherein the piston 13 is connected to a crankshaft (not illustrated) via a piston pin 14 and a connecting rod 15. Two intake valve holes 17 and 17 and two exhaust valve holes 18 and 18 facing a top face of the piston 13 are defined in a lower face of a cylinder head 16, which is joined to an upper face of the cylinder block 11. An intake port 19 communicates with the intake valve holes 17 and 17, and an exhaust port 20 communicates with the exhaust valve holes 18 and 18. The intake valve holes 17 and 17 are opened and closed by intake valves 21 and 21, and the exhaust valve holes 18 and 18 are opened and closed by exhaust valves 22 and 22. A fuel injector 23 is positioned on a piston central axis Lp, and a glow plug 24 is located adjacent the fuel injector 23.

The top face of the piston 13 and the lower face of the cylinder head 16 opposing the top face of the piston 13 are not flat or planar but are inclined relative to a piston central axis Lp and have a pentroof shape with a triangular cross-section. Due to the geometric configuration of the opposing faces of the piston 13 and cylinder head 16, it is possible to reduce the curvature of the intake port 19 and the exhaust port 20, ensure a suitable or proper diameter of the intake valve holes 17 and 17 and the exhaust valve holes 18 and 18, and enhance the intake and the exhaust efficiencies of the engine.

A cavity 25, with the piston central axis Lp as a center of the cavity 25, is recessed in the top face of the piston 13. A pair of faces 13b and 13b are formed radially outside of the cavity 25 and incline downward to the intake side and the exhaust side, respectively, from top portions 13a and 13a which extend linearly parallel to the piston pin 14. A pair of flat faces 13c and 13c are formed in the vicinity of the lower end of the inclined faces 13b and 13b so as to be perpendicular relative to the piston central axis Lp. A pair of cutout portions 13d and 13d are formed by cutting out opposite ends of the top portions 13a and 13a so as to be flat.

The fuel injector 23, which is disposed along the piston central axis Lp, injects fuel in six directions spaced at intervals of 60° in the circumferential direction with a fuel-injection point Oinj, which is a virtual point on the piston central axis Lp, as the center. Among six fuel-injection axes, two first fuel-injection axes Li1 overlap the piston pin 14 when viewed in the piston central axis Lp direction, and the other four second fuel-injection axes Li2 intersect the piston pin 14 direction at angles of 60°. Furthermore, when viewed in a direction perpendicular to the piston central axis Lp, the six first and second fuel-injection axes Li1 and Li2 are inclined obliquely downward, wherein the degree of downward inclination is relatively small for the first fuel-injection axes Li1 and relatively large for the second fuel-injection axes Li2 (see FIGS. 6 and 7).

Here, an injection point where the fuel injector 23 injects fuel is slightly displaced radially outward from the piston central axis Lp, but the fuel-injection point Oinj is defined as a point where the first and second fuel-injection axes Li1 and Li2 intersect the piston central axis Lp. In addition, the fuel injector 23 carries out main injection and secondary injection, which will be described later, and the main injection and secondary injection are carried out from the same injection hole. Because of this, it is possible to simplify the structure of the fuel injector 23 compared with when an injection hole for main injection and an injection hole for secondary injection are separately provided.

Figure 5:
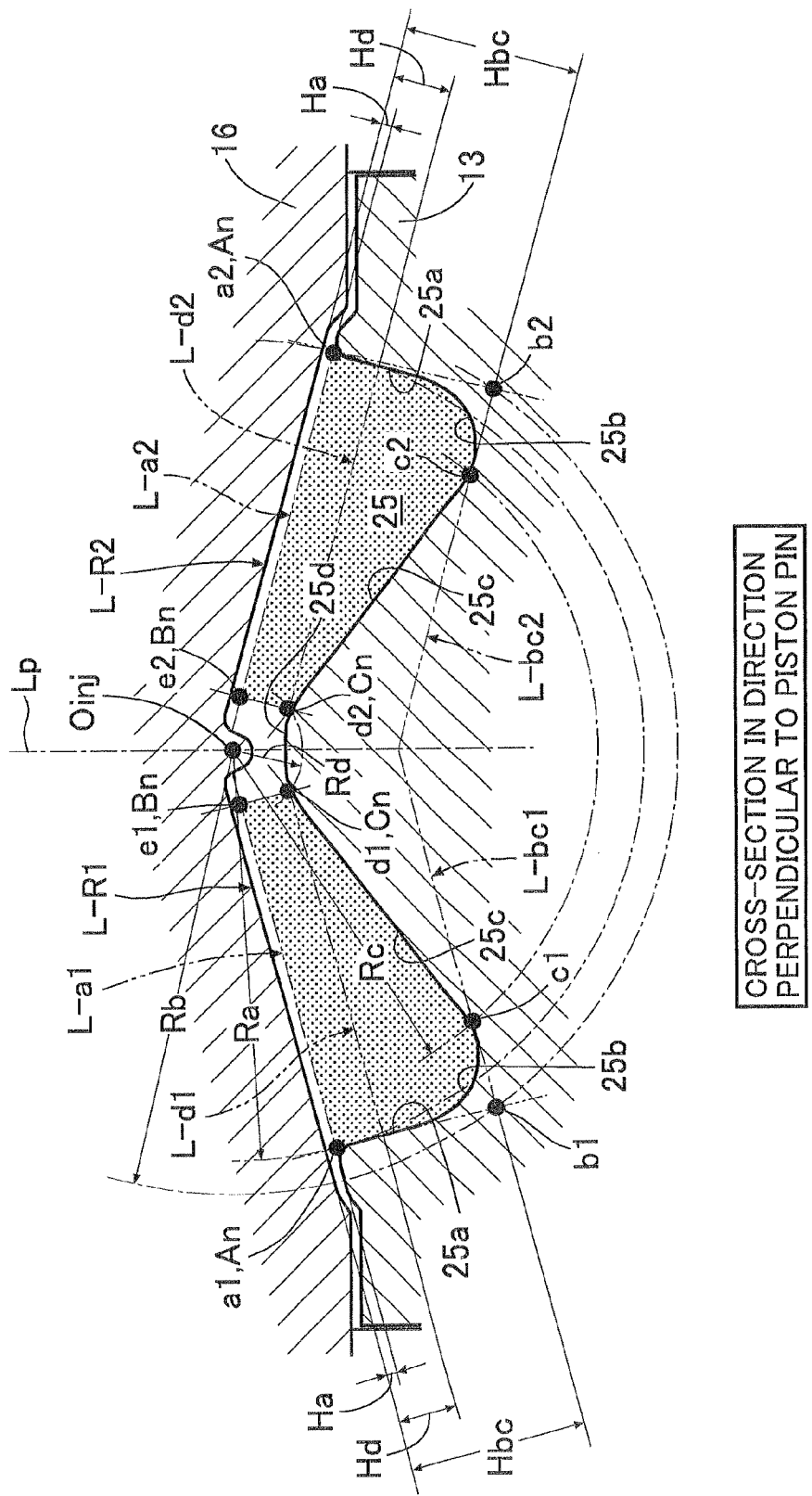
FIG. 5 is a cross-sectional view taken along line 5-5 in FIG. 3.

Next, the cross-sectional shape of a cavity 25 taught in JP '443 as it relates to the present invention is explained in detail by reference to FIGS. 5 to 7. The reason why the cross-sectional shape of the cavity 25 in JP '443 is explained here is that the cross-sectional shape of the cavity 25 in JP '443 is obtained by correcting the cross-sectional shape of the cavity 25. FIG. 5 is a cross-section in a direction perpendicular to the piston pin 14, FIG. 6 is a cross-section in a direction that intersects the piston pin 14 at 60° (cross-section including second fuel-injection axis Li2), and FIG. 7 is a cross-section in a direction along the piston pin 14 (cross-section including first fuel-injection axis Li1).

The invention in JP '443 aims to make the shape of the cavity 25, as much as possible, the same for any cross-section passing through the piston central axis Lp. The cross-sectional shape of the cavity 25 is divided into two, that is, left and right portions, sandwiching the piston central axis Lp. The two portions are substantially linearly connected in the cross-section in the piston pin 14 direction in FIG. 7, but are connected in a peak shape in accordance with the pentroof shape of the piston 13 in cross-section in a direction perpendicular to the piston pin 14 in FIG. 5 and in cross-section in a direction that intersects the piston pin 14 at 60° in FIG. 6. Here, essential parts of the cross-sectional shape of the cavity 25, that is, the shaded portions in FIG. 5 to FIG. 7, are exactly the same.

Figure 6:
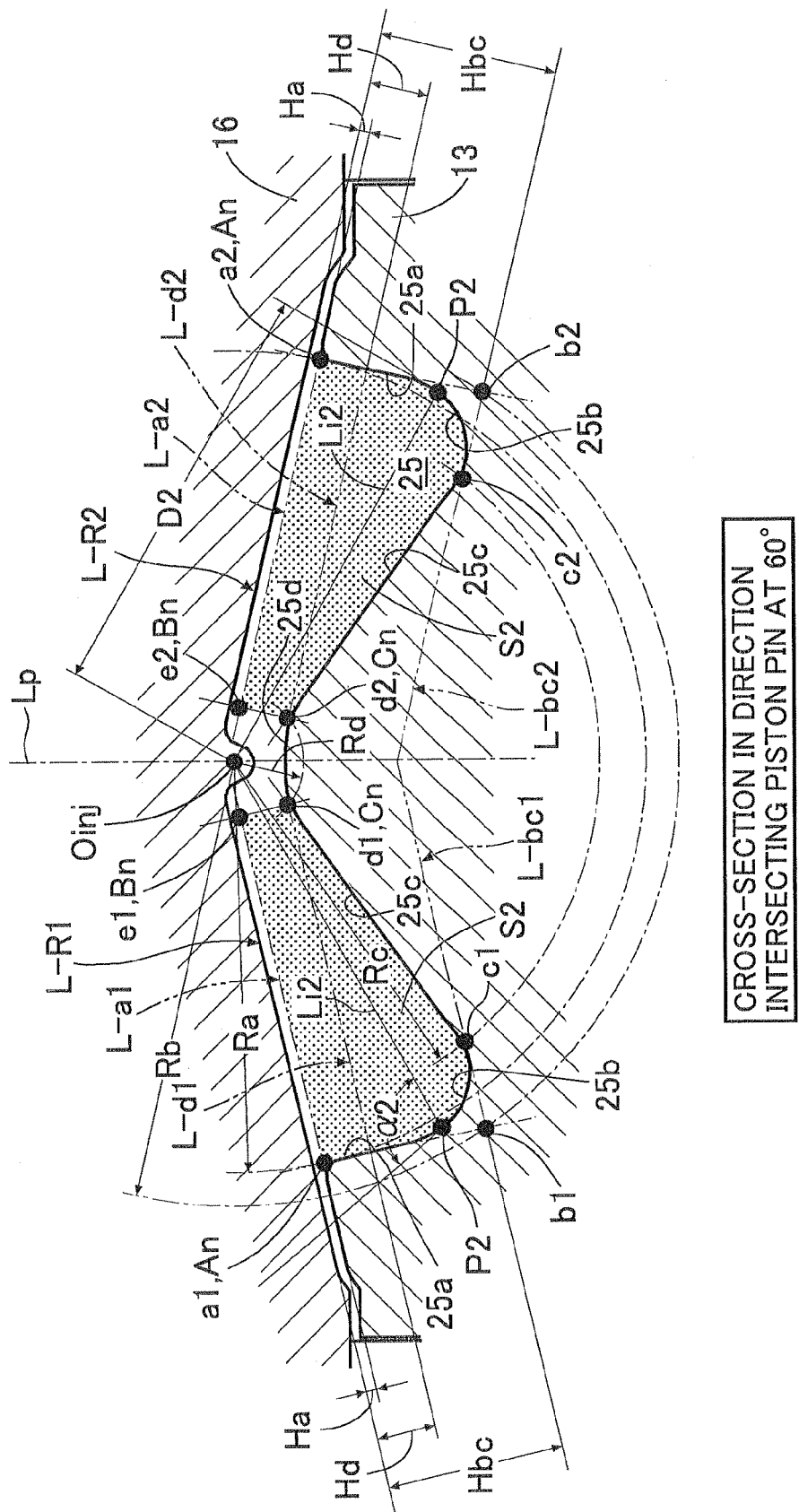
FIG. 6 is a cross-sectional view taken along line 6-6 in FIG. 3.
Figure 7:
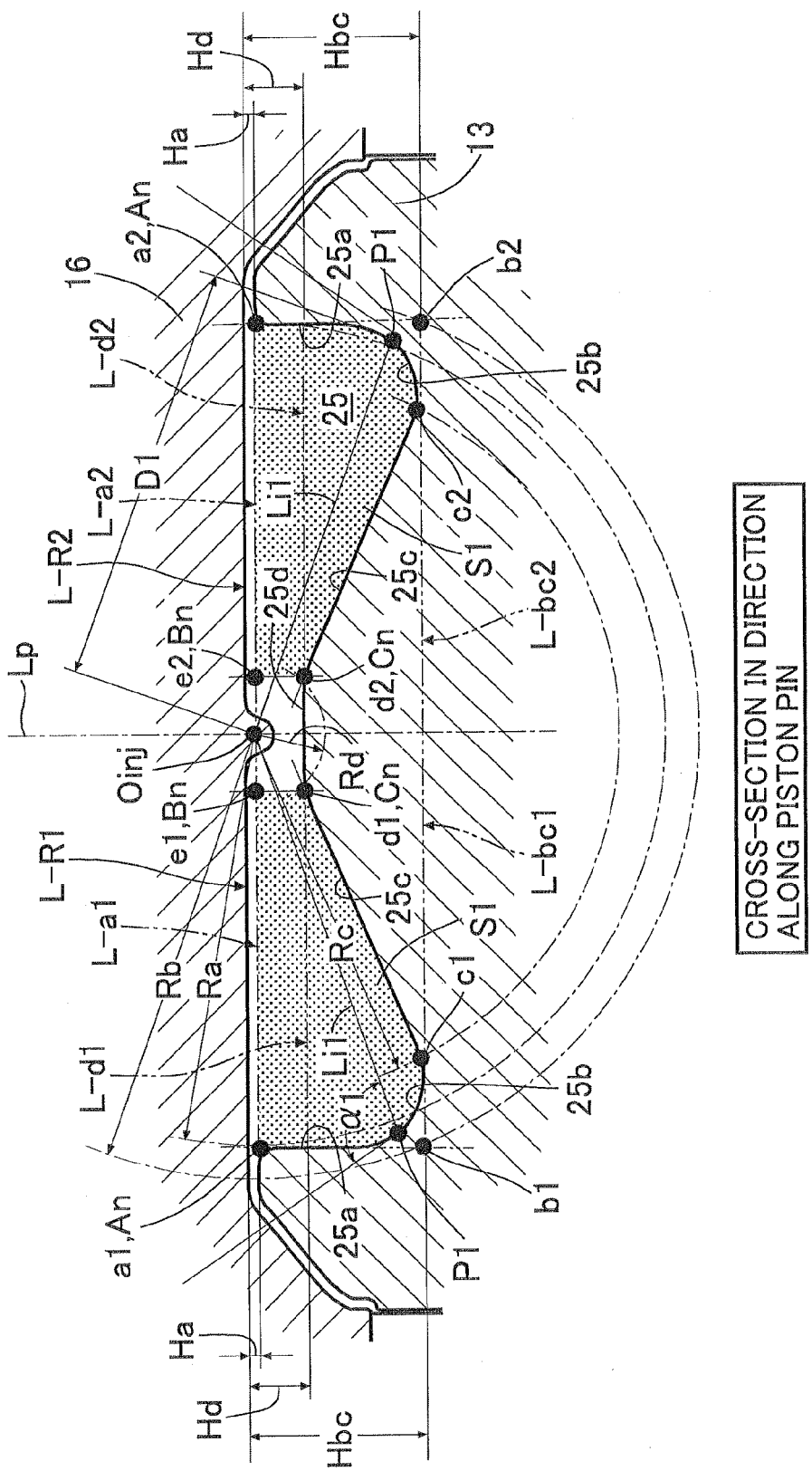
FIG. 7 is a cross-sectional view taken along line 7-7 in FIG. 3.

As is clear from FIG. 5 to FIG. 7, the cavity 25 formed with the piston central axis Lp as the center is formed from a peripheral wall portion 25a extending linearly downward from the top face of the piston 13, a curved wall portion 25b curving in a concave shape from the lower end of the peripheral wall portion 25a toward the piston central axis Lp, a bottom wall portion 25c extending linearly obliquely upward from the radially inner end of the curved wall portion 25b toward the piston central axis Lp, and a top portion 25d connected to the radially inner end of the bottom wall portion 25c on the piston central axis Lp.

Lines extending parallel to and spaced by a distance Ha downward from lines L-R1 and L-R2 denoting the lower face of the cylinder head 16 facing the cavity 25 are defined as piston top face baselines L-a1 and L-a2. Similarly, lines extending parallel to and spaced by a distance Hbc downward from the lines L-R1 and L-R2 denoting the lower face of the cylinder head 16 are defined as cavity bottom face baselines L-bc1 and L-bc2. Also, lines extending parallel to and spaced by a distance Hd downward from the lines L-R1 and L-R2 denoting the lower face of the cylinder head 16 are defined as cavity top portion baselines L-d1 and L-d2.

Intersection points of an arc having a radius Ra and the fuel-injection point Oinj as the center with the piston top face baselines L-a1 and L-a2 are defined at a1 and a2. Similarly, intersection points of an arc having a radius Rb and the fuel-injection point Oinj as the center with the cavity bottom face baselines L-bc1 and L-bc2 are defined at b1 and b2, while intersection points of an arc having a radius Rc and the fuel-injection point Oinj as the center with the cavity bottom face baselines L-bc1 and L-bc2 are defined at c1 and c2. Also, intersection points of an arc having a radius Rd and the fuel-injection point Oinj as the center with the cavity top portion baselines L-d1 and L-d2 are defined at d1 and d2. Intersection points e1 and e2 are points at which perpendicular lines from the intersection points d1 and d2 to the piston top face baselines L-a1 and L-a2 intersect the piston top face baselines L-a1 and L-a2.

The peripheral wall portion 25a of the cavity 25 is on the straight line a1b1 or a2b2, the bottom wall portion 25c of the cavity 25 coincides with the straight line c1d1 or c2d2, and the curved wall portion 25b of the cavity 25 connects the straight line a1b1 or a2b2 and the straight line c1d1 or c2d2.

The shape of the cavity 25 is configured so that the shaded cross-sectional shape defined by the intersection points a1, c1, d1, and e1 or the intersection points a2, c2, d2, and e2 is equal for any cross-section that passes through the piston central axis Lp.

The intersection points a1 and a2 correspond to a first specific point An of the present invention, the intersection points e1 and e2 correspond to a second specific point Bn of the present invention, and the intersection points d1 and d2 correspond to a third specific point Cn of the present invention.

With regard to the cross-sections that pass along the first and second fuel-injection axes Li1 and Li2 shown in FIGS. 6 and 7, the shaded portion in the cross-section (fuel-injection cross-section S1) in the piston pin 14 direction shown in FIG. 7 and the shaded portion in the cross-section (fuel-injection cross-section S2) in a direction that intersects the piston pin 14 at 60° shown in FIG. 6 have an identical shape.

In the cross-section direction along the piston pin 14 shown in FIG. 7, a point at which the first fuel-injection axis Lit intersects the cavity 25 is defined as an injection collision point P1, and in the cross-section in a direction that intersects the piston pin 14 at 60° shown in FIG. 6, a point at which the second fuel-injection axis Li2 intersects the cavity 25 is defined as an injection collision point P2. The two injection collision points P1 and P2 are present at the same positions of the shaded cross-sections having identical shapes. Therefore, the position of the injection collision point P2 is lower than the position of the injection collision point P1, and the second fuel-injection axis Li2 extending from the fuel-injection point Oinj injects fuel further downward than the first fuel-injection axis Li1.

A distance D1 from the fuel-injection point Oinj to the injection collision point P1 is substantially the same as a distance D2 from the fuel-injection point Oinj to the injection collision point P2. Furthermore, an injection collision angle α1 formed by a tangent to the cavity 25 at the injection collision point P1 and the first fuel-injection axis Li1 is substantially the same as an injection collision angle α2 formed by a tangent to the cavity 25 at the injection collision point P2 and the second fuel-injection axis Li2.

As hereinbefore described, in accordance with the teachings in JP '443, with regard to any cross-section that passes through the piston central axis Lp, the cross-sectional shapes of the cavity 25, excluding a very small part in the vicinity of the fuel-injection point Oinj (region surrounded by intersection points e1, d1, d2, and e2), are formed so as to be identical. In particular, with regard to the two cross-sections including the first and second fuel-injection axes Li1 and Li2 (see FIGS. 6 and 7), since the cross-sectional shapes of the cavity 25 are configured to be identical, the distances D1 and D2 from the fuel-injection point Oinj to the injection collision points P1 and P2 in the two cross-sections are set to be substantially equal, and the injection collision angles α1 and α2 at the injection collision points P1 and P2 are set to be substantially equal, the conditions in which air and fuel are mixed in each portion of the cavity 25 are made uniform in the circumferential direction, thereby improving the combustion conditions for the gas mixture, increasing engine output, and reducing the harmful amount of exhausted substances.

Furthermore, in the cross-sections in which the top face of the piston 13 is inclined, as shown in FIGS. 5 and 6, since the angle formed by the edge of the opening of the cavity 25 (portion at intersection point a2) is not configured to be acute relative to a case in which the top face of the piston 13 is flat, as shown in FIG. 7, it is possible to reduce the thermal load of this portion and improve the heat resistance.

Incidentally, in JP '443, the cross-sectional shapes of the cavity 25 in FIGS. 5 to 7 are exactly the same in the shaded portions, but vary in the white regions surrounded by the intersection points e1, d1, d2, and e2 in the vicinity of the fuel-injection point Oinj. The reason therefor is that two portions sandwiching the piston central axis Lp in the cross-sectional shape of the cavity 25 are connected in a substantially straight line in the cross-section direction along the piston pin 14 in FIG. 7, but in the cross-section in a direction perpendicular to the piston pin 14 in FIG. 5 and in the cross-section direction intersecting the piston pin 14 at 60° in FIG. 6, they are connected in a peak shape in accordance with the pentroof shape of the piston 13. The area of the white region surrounded by the intersection points e1, d1, d2, and e2 is the largest in the cross-section direction along the piston pin 14 in FIG. 7, decreases in the cross-section direction intersecting the piston pin 14 at 60° in FIG. 6, and further decreases in the cross-section direction perpendicular to the piston pin 14 in FIG. 5.

The embodiment of the present invention makes the conditions in which air and fuel are mixed more uniformly in cross-sections in all directions of the cavity 25 by correcting, with as a reference the cross-sectional shape (see FIG. 7) of the cavity 25 in the piston pin 14 direction in which the area of the white region surrounded by the intersection points e1, d1, d2, and e2 is a maximum, the cross-sectional shape in other directions so that it enlarges (that is, increasing in directions in which the depth of the cavity 25 increases), thus compensating for the difference in area between the white regions surrounded by the intersection points e1, d1, d2, and e2.

Figure 8:
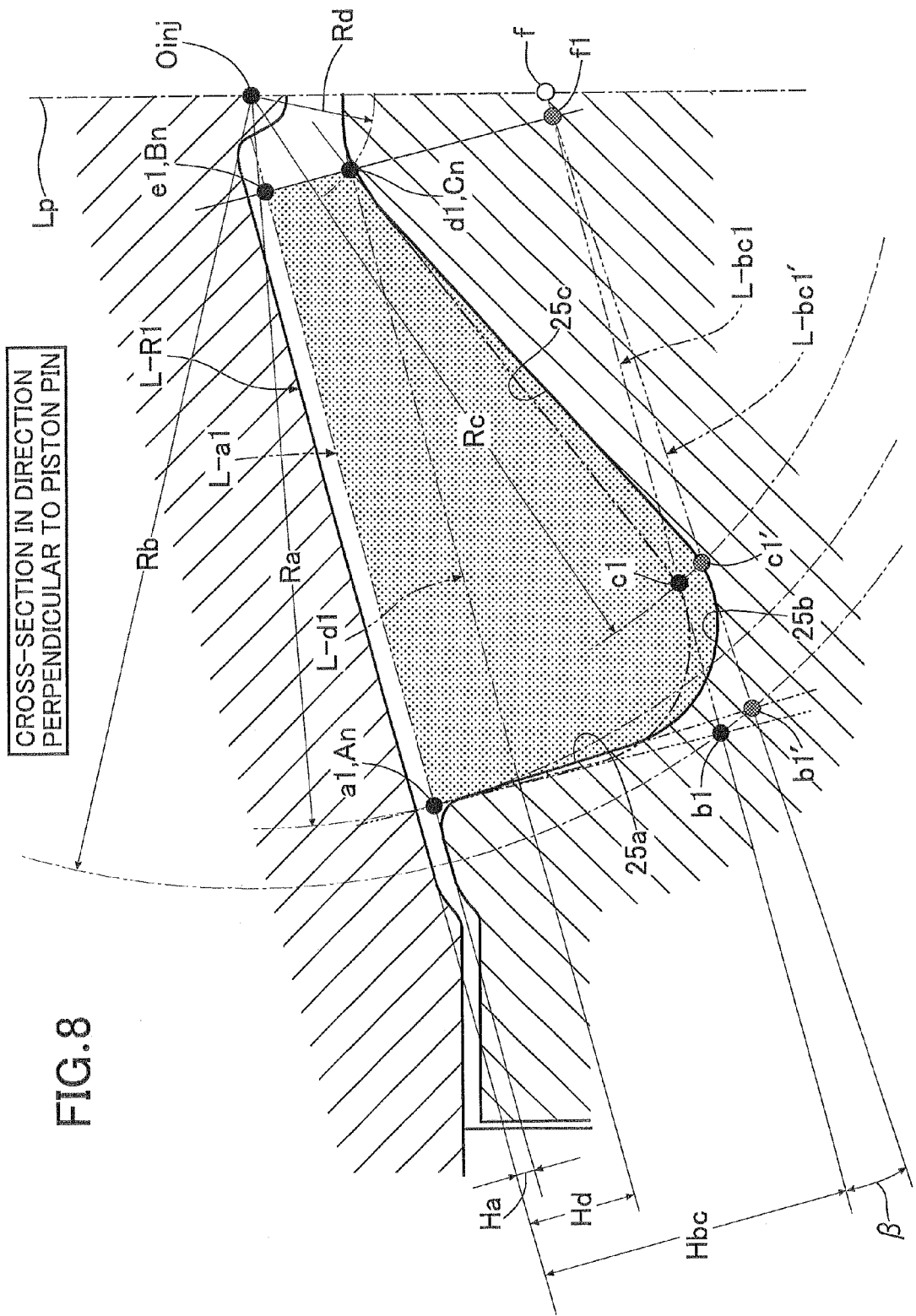
FIG. 8 is a cross-sectional view showing a cross-sectional shape of a cavity after correction.

FIG. 8 explains a method for correcting the cross-sectional shape of the cavity 25 in the direction perpendicular to the piston pin 14 in FIG. 5. The shape denoted by a broken line corresponds to JP '443, and the shape denoted by a solid line corresponds to the present invention.

Correction of the cross-sectional shape of the cavity 25 in accordance with the present invention is carried out by moving the positions of the intersection point b1 and the intersection point c1 downward to an intersection point b1' and an intersection point c1', respectively, to increase the area of the shaded portion.

First, an intersection point between the cavity bottom face baseline L-bc1 and a downward extension of the straight line e1d1 is defined as f1. Subsequently, the cavity bottom face baseline L-bc1, which passes through the intersection point f1, is rotated downward by a predetermined angle β with the intersection point f1 as the center, and a new cavity bottom face baseline L-bc1' is set. Subsequently, an intersection point between the arc having a radius Rb with the fuel-injection point Oinj as the center and the new cavity bottom face baseline L-bc1' is defined as the above b1', and an intersection point between the arc having a radius Rc with the fuel-injection point Oinj as the center and the new cavity bottom face baseline L-bc1' is defined as the above e1'.

In the cross-sectional shape of the cavity 25 after correction, the peripheral wall portion 25a of the cavity 25 is on the straight line a1b1', the bottom wall portion 25c of the cavity 25 coincides with the straight line c1'd1, and the curved wall portion 25b of the cavity 25 connects the straight line a1b1' and the straight line c1'd1.

Here, an intersection point between the cavity bottom face baseline L-bc1 and the piston central axis Lp is identified by reference character f. A new cavity bottom face baseline L-bc1' can be determined by rotating the cavity bottom face baseline L-bc1 downward by the predetermined angle β with the intersection point f as the center.

Although, when looking at the path AnCn on an inner wall face of the cavity 25, a section from the lowest part of the path AnCn to the third specific point Cn is close to the second fuel-injection axis Li2, by changing the shape of the section in the aforementioned manner, it is possible to suppress attachment of fuel to the inner wall face of the cavity 25 and prevent combustion from degrading.

In the present embodiment, net mean effective pressure (NMEP) is improved on the order of 2% relative to the subject matter taught in JP '443 in a state in which soot is not generated.

Figure 9:
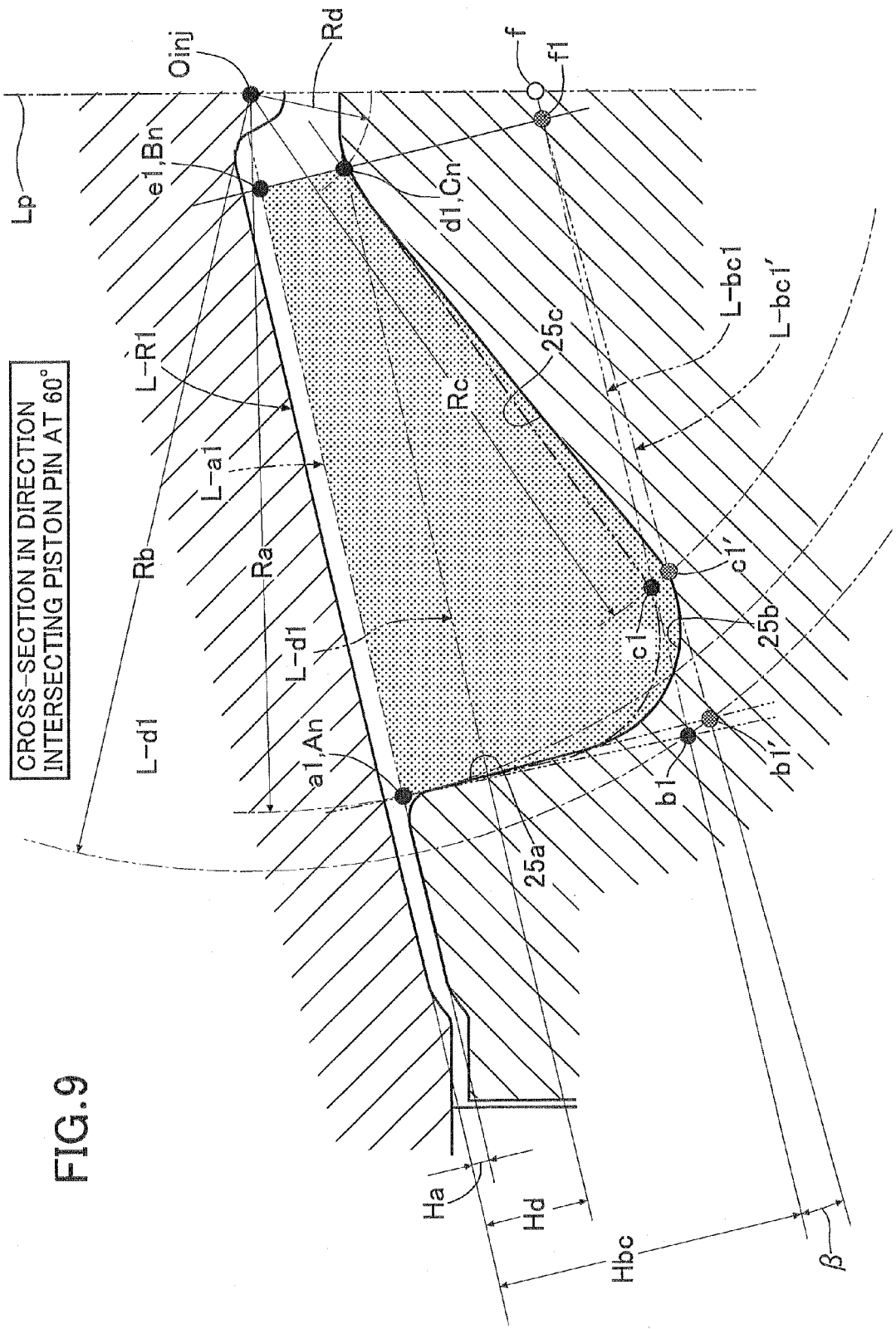
FIG. 9 is a cross-sectional view showing a cross-sectional shape of a cavity after correction.

FIG. 9 explains a method for correcting the cross-sectional shape of the cavity 25 in a direction that intersects the piston pin 14 at 60° in FIG. 6. The shape denoted by a broken line corresponds to the subject matter taught in JP '443, and the shape denoted by a solid line corresponds to the present invention.

Since, compared with the difference in white area surrounded by the intersection points e1, d1, d2, and e2 between FIG. 7 (piston pin 14 direction) and FIG. 5 (direction perpendicular to the piston pin 14), the difference in the area between FIG. 7 (piston pin 14 direction) and FIG. 6 (direction intersecting the piston pin 14 at 60°) is small, the amount of enlargement in the cross-sectional shape of the cavity 25 in FIG. 9 (direction intersecting the piston pin 14 at 60°) is smaller than the amount of enlargement in the cross-sectional shape of the cavity 25 in FIG. 8 (direction perpendicular to the piston pin 14).

Correction of the cross-sectional shape of the cavity 25 on one side of the piston central axis Lp is explained above, and correction of the cross-sectional shape of the cavity 25 on the other side of the piston central axis Lp is carried out in exactly the same manner.

As hereinbefore described, in accordance with the shape of the cavity 25 of the present invention, a problem of the subject matter taught in JP '443, that is, the difference in cross-sectional shape of the cavity 25 in the region surrounded by the intersection points e1, d1, d2, and e2 in the vicinity of the fuel-injection point Oinj, can be compensated for, and it is therefore possible to make the conditions in which air and fuel are mixed in each portion of the cavity 25 more uniform in the circumferential direction, improve the combustion conditions for the gas mixture, further increase the engine output, and further reduce harmful exhaust materials.

Figure 10:
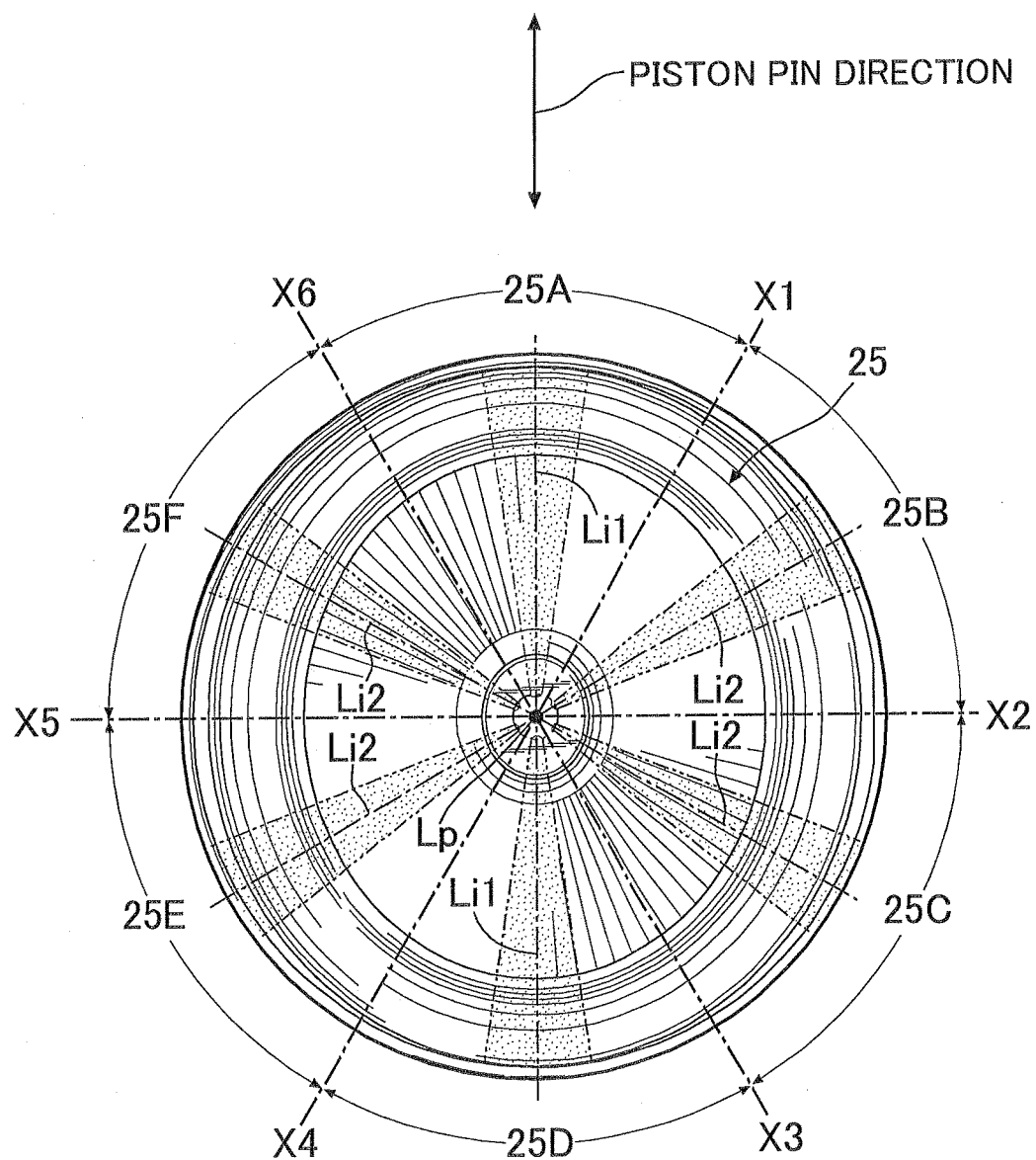
FIG. 10 is a view for explaining virtual cavity sections.

FIG. 10 is a view for explaining, from another viewpoint, correction of the cross-sectional shape of the cavity 25 in accordance with the present invention.

In FIG. 10, six half planes X1 to X6 extend radially from the piston central axis Lp passing through the center of the cavity 25. Angles (included angles) formed by two adjacent half planes X1 to X6 are each 60°, and six bisectors that bisect the half planes X1 to X6 overlap the first and second fuel-injection axes Li1 and Li2 when viewed in the piston central axis Lp direction. The cavity 25 is divided into six virtual cavity sections 25A to 25F by the six half planes X1 to X6 and, in accordance with the present invention, due to the above-mentioned correction of the cross-sectional shape of the cavity 25, it is possible to set the volumes of the six cavity sections 25A to 25F to be identical or equal to each other.

However, it is not necessary to set the volumes of the six cavity sections 25A to 25F to be absolutely identical. Even if the volumes are set to be substantially identical, it is possible to make the conditions in which fuel is mixed more uniformly in the circumferential direction compared with the subject matter taught in JP '443 or by JP '661. Specifically, by making the variation in volume of the six cavity sections 25A to 25F, that is, the difference in volume between the maximum volume cavity section and the minimum volume cavity section, small compared with that in JP '443 or JP '661, it is possible to make the conditions in which fuel is mixed more uniformly in the circumferential direction.

Figure 11:
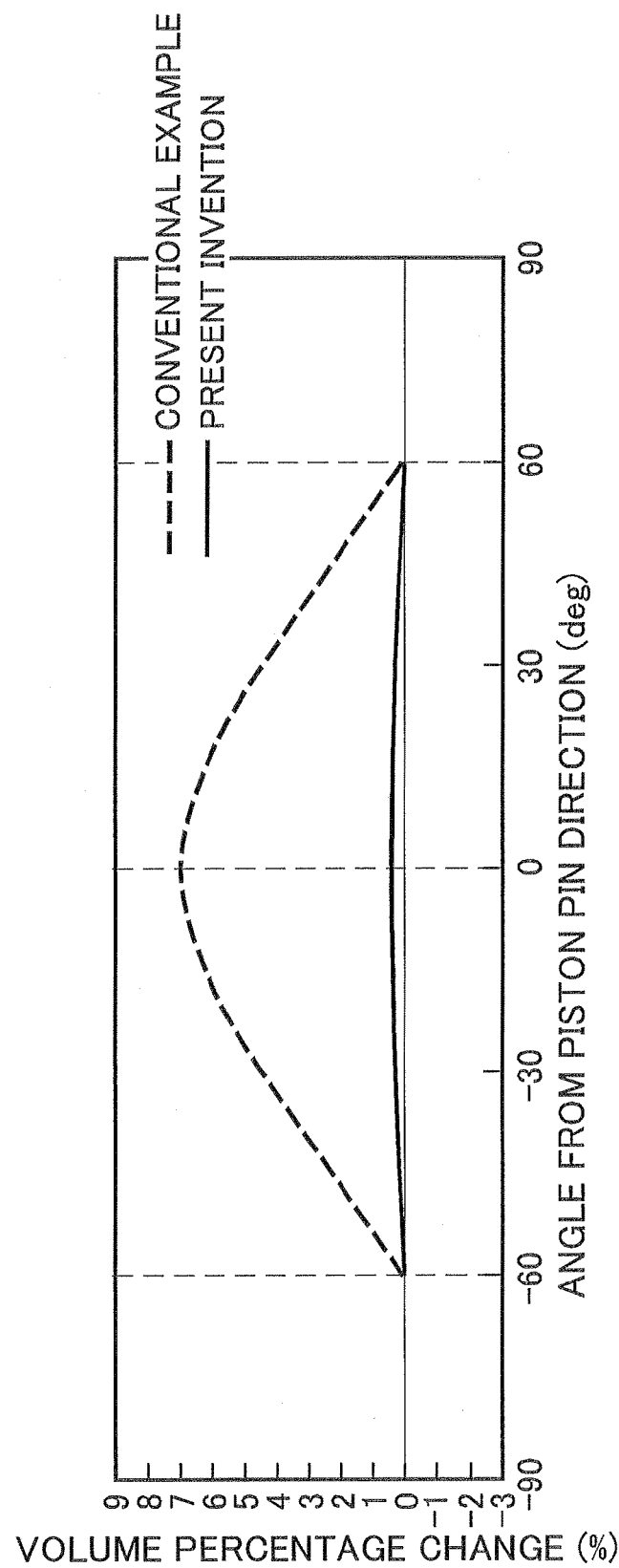
FIG. 11 is a graph showing a rate of change in volume of the cavity section when the direction of the cavity section is changed in the circumferential direction.

FIG. 11 shows the percentage change in volume of the cavity section when the direction of the cavity section (i.e. direction of the bisector of the included angle of the cavity section) is moved in a range of 60° left and right of the piston central axis Lp with the piston pin 14 direction as a reference (0°). The broken line corresponds to the conventional example, and the solid line corresponds to the present invention.

In all cases, the point when the direction of the bisector of the included angle of the cavity section intersects the piston pin 14 direction at 60° (see cavity sections 25B, 25C, 25E, and 25F in FIG. 10) is taken as a reference, and the percentage change at that point is 0%. In the conventional example shown by the broken line, when the direction of the bisector of the included angle of the cavity section coincides with the piston pin 14 direction (see cavity sections 25A and 25D in FIG. 10), the percentage change is a maximum on the order of 7%, but in the present invention, which is shown by the solid line, although the percentage change is a maximum at the same position, the value is greatly reduced and is suppressed to only 0.5%.

Therefore, the shape of the cavity 25 of the present invention can be defined wherein the variation in volume of the cavity sections 25A to 25F is smaller than the variation in volume of the cavity sections 25A to 25F of the conventional example in which the depth of the cavity is made uniform in the circumferential direction.

Now, an important point when subjecting fuel to main injection or secondary injection from the fuel injector 23 is that fuel does not leak outside from the open end of the cavity 25 and does not collide with the bottom wall portion 25c of the cavity 25 (see FIG. 5 to FIG. 7). The reason is that if fuel leaks outside from the open end of the cavity 25, fuel that has leaked is not used effectively for combustion of the gas mixture within the cavity 25. Also, if fuel collides with the bottom wall portion 25c of the cavity 25, the fuel becomes attached to the bottom wall portion 25c and is not used effectively for combustion of the gas mixture.

Figure 12A:
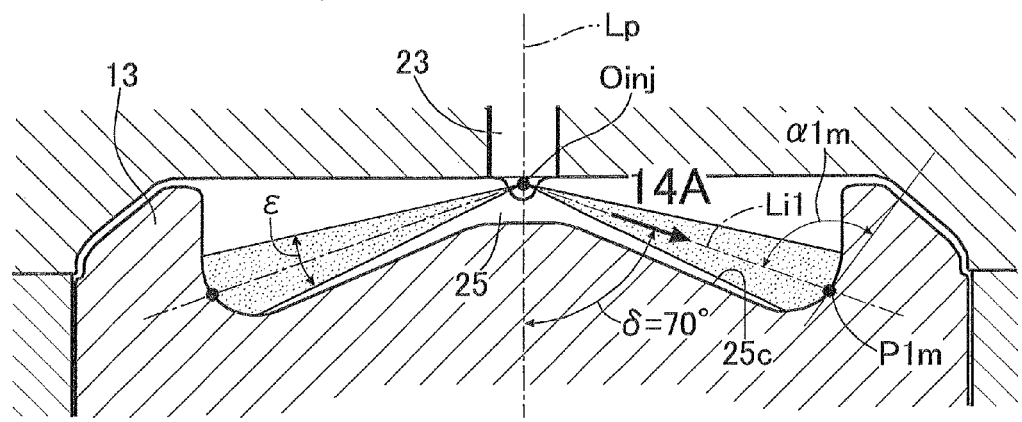
FIGS. 12A and 12B are cross-sectional views showing a first fuel-injection axis at the time of main injection and secondary injection.
Figure 12B:
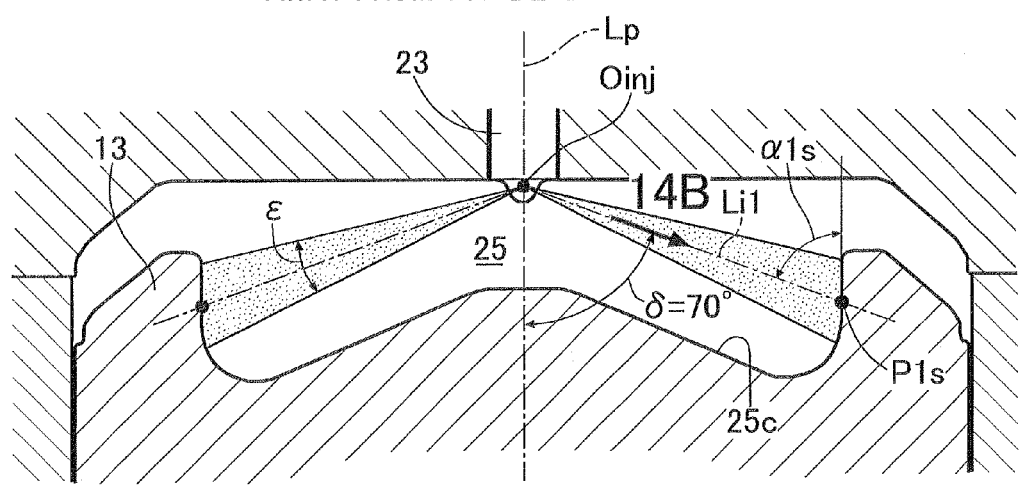

FIGS. 12A and 12B show a cross-section of the cavity 25 in the piston pin 14 direction. FIG. 12A shows a state in which the piston 13 is in the vicinity of top dead center and the fuel injector 23 is carrying out main injection. FIG. 12B shows a state in which the piston 13 is at a position away from top dead center (a crank angle position of 30° advance or delay from top dead center) and the fuel injector 23 is carrying out secondary injection (pre-injection or post-injection). Here, the crank angle position at which secondary injection is carried out may be 30° to 40° advance or delay from top dead center.

A fuel-injection axis bevel angle (cone angle) formed by the two first fuel-injection axes Li1 is 140°, and a fuel-injection axis bevel half angle $\delta$ formed by the first fuel-injection axis Li1 relative to the piston central axis Lp is 70°. A main injection collision point P1$m$ in FIG. 12A is the same as the injection collision point P1 at which the first fuel-injection axis Li1 intersects the cavity 25 explained above with reference to FIG. 7. In FIG. 12A, fuel that is subjected to main injection along the first fuel-injection axis Li1 when the piston 13 is in the vicinity of top dead center collides with the inner wall face of the cavity 25 while being scattered at an angle of $\epsilon$, but the lower end of the fuel does not collide with the bottom wall portion 25c of the cavity 25 and does not leak outside the cavity 25. In FIG. 12B, fuel that is subjected to secondary injection along the first fuel-injection axis Li1 when the piston 13 is at a low position away from top dead center collides with the inner wall face of the cavity 25 at the secondary injection collision point P1$s$ while being scattered at an angle $\epsilon$. However, the upper level of the fuel does not leak from the cavity 25 and does not collide with the bottom wall portion 25c of the cavity 25.

Figure 14A:
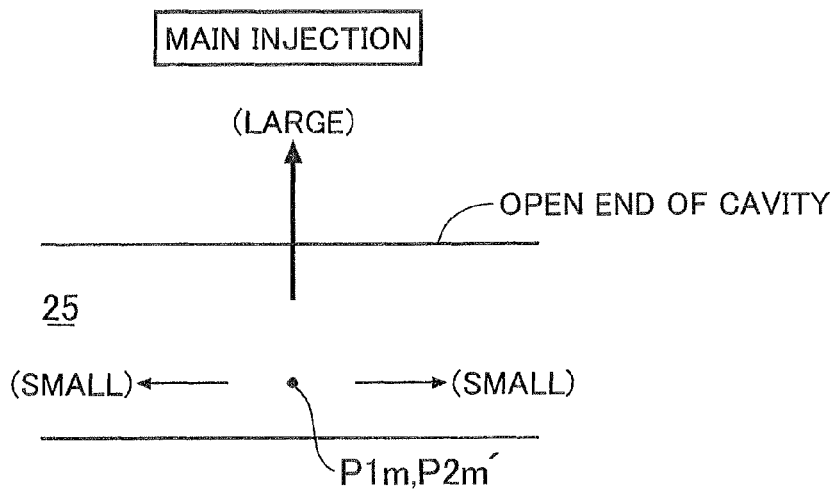
FIGS. 14A and 14B are views from directions of arrows 14A and 14B in FIGS. 12A and 12B, and 13A and 13B, respectively.

In the main injection state shown in FIG. 12A, since the piston 13 is at a high position, the main injection collision point P1$m$ is located at a position deep within the cavity 25, and a main injection collision angle $\alpha 1m$ formed between the first fuel-injection axis Li1 and a tangent drawn at the main injection collision point P1$m$ from the inner wall face of the cavity 25 to the open end side (that is, the main injection collision angle $\alpha 1m$ formed between the first fuel-injection axis Li1 and the inner wall face of the cavity 25 on the open end side relative to the main injection collision point P1$m$) becomes obtuse. The fuel that has collided with the main injection collision point P1$m$ is deflected primarily to the open end side of the cavity 25, thus reducing the amount of unused air in an upper part of the cavity 25 (see FIG. 14A).

Figure 14B:
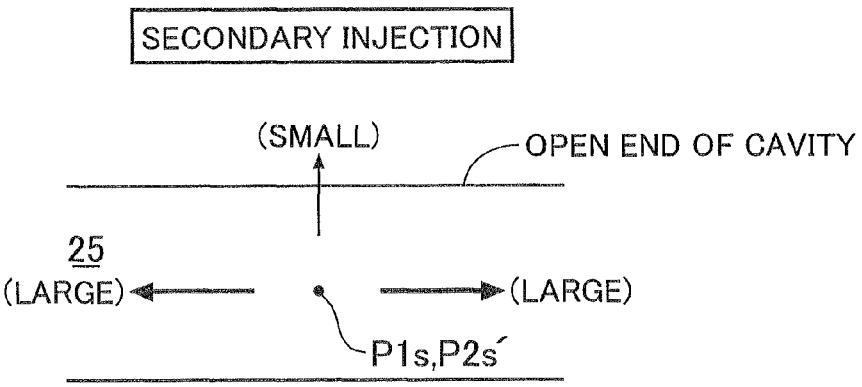

On the other hand, in the secondary injection state shown in FIG. 12B, since the position of the piston 13 is low, the secondary injection collision point P1s is located at a shallow position within the cavity 25, a secondary injection collision angle α1s formed between the first fuel-injection axis Li1 and a tangent drawn at the secondary injection collision point P1s from the inner wall face of the cavity 25 to the open end side (that is, the secondary injection collision angle α1s formed between the first fuel-injection axis Li1 and the inner wall face of the cavity 25 on the open end side relative to the secondary injection collision point P1s) becomes acute or a right angle. The fuel that has collided with the secondary injection collision point P1s is deflected primarily in the circumferential direction of the cavity 25, thereby enabling the amount of unused air between adjacent first and second fuel-injection axes Li1 and Li2' to be reduced (see FIG. 14B).

Figure 13A:
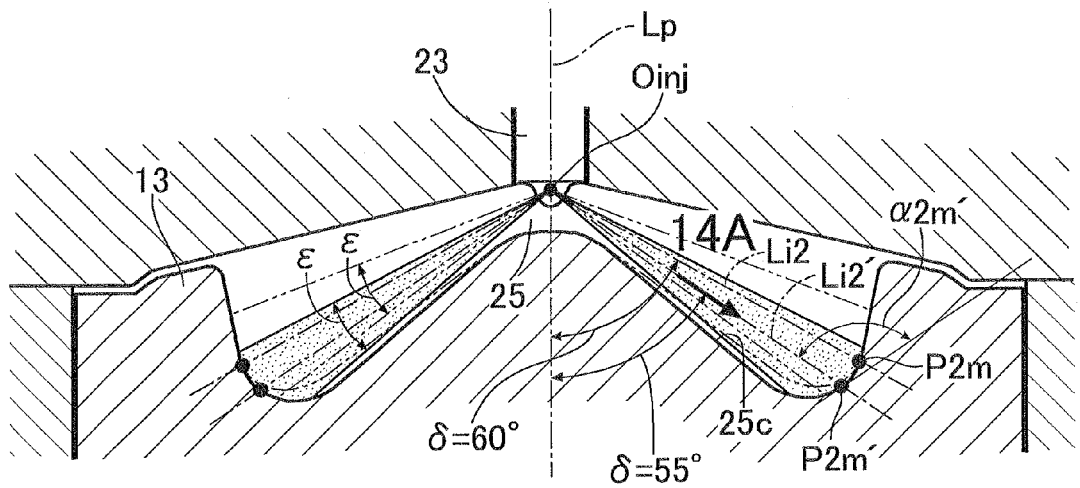
FIGS. 13A and 13B are cross-sectional views showing a second fuel-injection axis at the time of main injection and secondary injection.
Figure 13B:
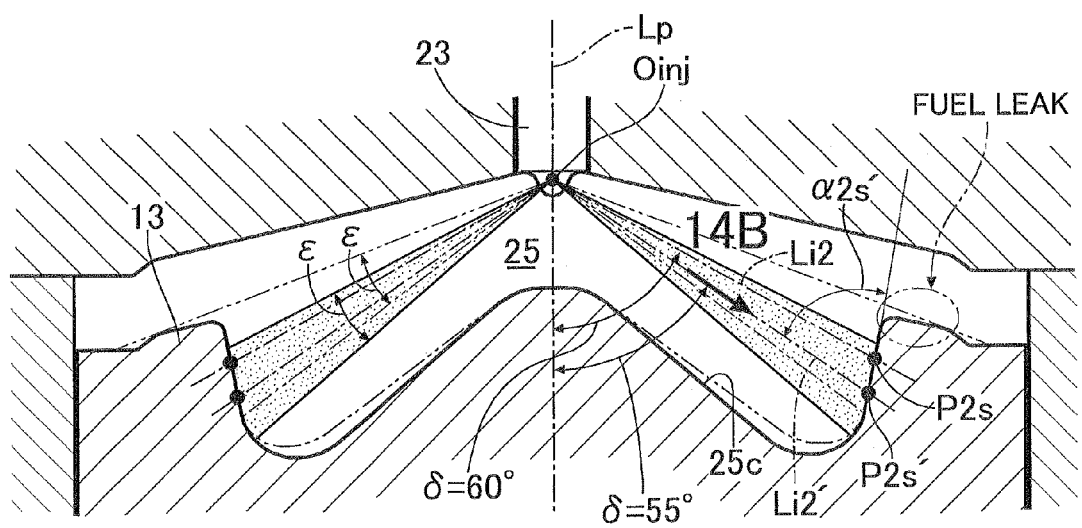

FIGS. 13A and 13B show cross-sections that intersect the piston pin 14 direction of the cavity 25 at 60°. FIG. 13A shows a state in which the piston 13 is in the vicinity of top dead center and the fuel injector 23 is carrying out main injection. FIG. 13B shows a state in which the piston 13 is at a position away from top dead center (the crank angle position being 30° advance or delay from top dead center) and the fuel injector 23 is carrying out secondary injection (pre-injection or post-injection).

The main injection collision point P2m in FIG. 13A is the same as the injection collision point P2 where the second fuel-injection axis Li2 intersects the cavity 25 explained above with reference to FIG. 6. In the present invention, the main injection collision point P2m' where the second fuel-injection axis Li2 intersects with the cavity 25 is set lower than or below the main injection collision point P2m. That is, in the present invention, compared with the subject matter taught in JP '443, since the bottom wall portion 25c of the cavity 25 is expanded downward from the chained line to the solid line, even when the second fuel-injection axis is moved downward from Li2 to Li2' a corresponding extent, and the main injection collision point is moved downward from P2m to P2m', fuel that is subjected to main injection when the piston 13 is in the vicinity of top dead center does not become attached to the bottom wall portion 25c of the cavity 25.

On the other hand, as shown in FIG. 13B, when the piston 13 is at a low position away from top dead center, the upper level of fuel subjected to secondary injection in the direction of the second fuel-injection axis Li2 will leak from the open end of the cavity 25, but the upper level of fuel subjected to secondary injection in the direction of the second fuel-injection axis Li2', which is downwardly modified, does not leak from the open end of the cavity 25.

As hereinbefore described, by moving the second fuel-injection axis Li2' intersecting the piston pin 14 direction 60° downward by an extent corresponding to the downward expansion of the bottom wall portion 25c of the cavity 25 to move the main injection collision point P2m' downward, it is possible to prevent fuel from leaking from the open end of the cavity 25 during secondary injection while preventing fuel from colliding with the bottom wall portion 25c of the cavity 25 during main injection.

In the main injection state shown in FIG. 13A, since the position of the piston 13 is high, the main injection collision point P2m' is located at a position deep within the cavity 25, and the main injection collision angle α2m' formed by the second fuel-injection axis Li2' and a tangent drawn at the main injection collision point P2m' from the inner wall face of the cavity 25 to the open end side becomes obtuse. Fuel that collides with the main injection collision point P2m' is then redirected primarily to the open end side of the cavity 25, thus reducing the amount of unused air in an upper part of the cavity 25 (see FIG. 14A).

On the other hand, in the secondary injection state shown in FIG. 13B, since the position of the piston 13 is low, the secondary injection collision point P2s' is at a shallow position of the cavity 25, and the secondary injection collision angle α2s' formed between the second fuel-injection axis Li2' and a tangent drawn at the secondary injection collision point P2s' from the inner wall face of the cavity 25 to the open end side becomes acute or a right angle. Fuel that collides with the secondary injection collision point P2s' is then redirected primarily in the circumferential direction of the cavity 25, thus reducing the amount of unused air located between adjacent first and second fuel-injection axes Li1 and Li2' (see FIG. 14B).

The fuel-injection axis bevel angle formed by the two second fuel-injection axes Li2' in FIG. 13 is 110°. The fuel-injection axis bevel half angle δ formed by the second fuel-injection axis Li2' relative to the piston central axis Lp is preferably 55°, but may be in the range of 55° to 65°.

An embodiment of the present invention is explained above, but the present invention may be modified in a variety of ways as long as the modifications do not depart from the spirit and scope thereof.

For example, the piston 13 of the embodiment has a pen-troof-shaped top face, but the present invention may be applied to a piston having a flat top face.

Furthermore, the number of virtual cavity sections 25A to 25F in the above-described embodiment is set at six (N=6), but the number of cavity sections 25A to 25F may be two or more (N is a whole number of 2 or more).

In this case, the number of cavity sections 25A to 25F and the number of fuel-injection axes do not necessarily coincide with each other, but by making them coincide with each other, one fuel-injection axis corresponds to one cavity section 25A to 25F, and the conditions in which fuel is mixed can be made more uniform in the circumferential direction. Making the bisectors of the included angles of the cavity sections 25A to 25F coincide with fuel-injection axes allows the fuel-injection axis to be positioned at the center of each of the cavity sections 25A to 25F, thereby making the conditions in which fuel is mixed more uniform.

Furthermore, the volume of the virtual cavity sections 25A to 25F does not include the volume of a portion sandwiched between the lower face of the cylinder head 16 and the top face of the piston 13 when at top dead center, and is defined as the volume up to the opening edge of the cavity 25 (that is, the volume below the piston top face baselines L-a1 and L-a2). However, even if a volume including this portion is defined as the volume of the virtual cavity sections 25A to 25F, the same operational effects can be exhibited.

Moreover, although the present invention was described as relating to a diesel engine, the invention is not limited to a diesel engine and may be applied to any type of engine in which fuel is directly injected into a combustion chamber.

What is claimed is:

1. A direct fuel-injection engine comprising:
a piston;
a cavity recessed in a central part of a top face of the piston; and
a fuel injector which injects fuel into the cavity at a plurality of different injection angles (δ), the fuel injector performs main injection along a fuel-injection axes (Li1, Li2') oriented toward an inner wall face of the cavity when the piston is located at a first point located near a top dead center of the piston, and performs secondary injection along the fuel-injection axes (Li1, Li2') when the piston is located at a second position defined further away from the top dead center of the piston than the first point, wherein a shape of the inner wall face of the cavity is configured so that, with N as a whole number of 2 or more, when the cavity is divided into N virtual cavity sections by the inner wall face of the cavity and N half planes extending radially from a piston central axis (Lp) and having equal included angles, the fuel injection axes (Li1, Li2') are arranged correspondingly to the respective virtual cavity sections and depths of the respective virtual cavity sections are differentiated so as to correspond to the injections angles ($\delta$) of the fuel infection axes (Li1, Li2'), so that volumes of the virtual cavity sections are substantially equal, and when an intersection point of each fuel-injection axis (Li1, Li2') with the inner wall face of the cavity during the main injection is defined as a main injection collision point (P1$m$, P2$m$'), and an intersection point of each fuel-injection axis (Li1, Li2') with the inner wall face of the cavity during the secondary injection is defined as a secondary injection collision point (P1$s$, P2$s$'), a main injection collision angle ($\alpha$1$m$, $\alpha$2$m$') formed between the fuel-injection axis (Li1, Li2') and the inner wall face on the open end side of the cavity relative to the main injection collision point (P1$m$, P2$m$') is set at an obtuse angle, and a secondary injection collision angle ($\alpha$1$s$, $\alpha$2$s$') formed between the fuel-injection axis (Li1, Li2') and the inner wall face on the open end side of the cavity relative to the secondary injection collision point (P1$s$, P2$s$') is set at one of a right angle and an acute angle.

2. The direct fuel-injection engine according to claim 1, wherein the fuel-injection axes (Li1, Li2') spaced in the circumferential direction, a cross-section of the cavity passing through an nth fuel-injection axis (Li1, Li2') is defined as a fuel-injection cross-section Sn, an intersection point of the fuel-injection cross-section Sn with the open end of the cavity is defined as a first specific point An, a second specific point Bn is present on a line that passes through the first specific point An and is parallel to a lower face of a cylinder head in the fuel-injection cross-section Sn, a third specific point Cn is present on a bottom wall portion of the cavity in the fuel injection cross-section Sn, a distance between the second specific point Bn and the piston central axis (Lp) is shorter than a distance between the first specific point An and the piston central axis (Lp), a distance between the third specific point Cn and the piston central axis (Lp) is shorter than a distance between the piston central axis (Lp) and a position of the maximum outer diameter of the bottom wall portion of the cavity, a cross-sectional shape surrounded by a path AnBn connecting the first and second specific points An and Bn by a line along the lower face of the cylinder head, a path AnCn connecting the first and third specific points An and Cn along the wall face of the cavity, and a path BnCn connecting the second and third specific points Bn and Cn by the shortest straight line, is defined as said fuel-injection cross-section Sn, and the volume of each virtual cavity section is made substantially equal by changing the shape of the inner wall face of the cavity so that the fuel injection cross-section Sn, which passes through a fuel-injection axis (Li2') that is present in a direction where a height of the top face of the piston in the piston central axis (Lp) direction is lower, has its path AnCn moved in a direction where the depth of the corresponding virtual cavity section becomes larger.

* * * * *